(12) United States Patent
Siemetzki et al.

(10) Patent No.: US 9,371,126 B2
(45) Date of Patent: Jun. 21, 2016

(54) AIRCRAFT FUSELAGE

(71) Applicants: Airbus Operations GmbH, Hamburg (DE); EADS Deutschland GmbH, Ottobrunn (DE)

(72) Inventors: Markus Siemetzki, Ottobrunn (DE); Brian Bautz, Ottobrunn (DE); Lars Margull, Hamburg (DE); Matthias Waimer, Sindelfingen (DE); Tim Bergmann, Ottobrunn (DE); Sebastian Heimbs, Ottobrunn (DE); Paul Schatrow, Stuttgart (DE)

(73) Assignees: Airbus Operations GmbH, Hamburg (DE); EADS Deutschland GmbH, Ottobrunn (DE)

( * ) Notice: Subject to any disclaimer, the term of this patent is extended or adjusted under 35 U.S.C. 154(b) by 238 days.

(21) Appl. No.: 14/095,040

(22) Filed: Dec. 3, 2013

(65) Prior Publication Data

US 2015/0151828 A1 Jun. 4, 2015

(51) Int. Cl.
*B64C 1/06* (2006.01)

(52) U.S. Cl.
CPC .................................. *B64C 1/062* (2013.01)

(58) Field of Classification Search
CPC .......... B64C 1/061; B64C 1/062; B64C 1/18; B64C 1/064
See application file for complete search history.

(56) References Cited

U.S. PATENT DOCUMENTS

| | | | |
|---|---|---|---|
| 5,752,673 A * | 5/1998 | Schliwa | B64C 1/061 244/118.1 |
| 2002/0020782 A1 | 2/2002 | Huber | |
| 2009/0206202 A1 | 8/2009 | Bolukbasi et al. | |
| 2009/0294588 A1 * | 12/2009 | Griess | B64C 1/068 244/121 |
| 2010/0096501 A1 | 4/2010 | Meyer | |
| 2011/0042513 A1 * | 2/2011 | Milliere | B64C 1/062 244/121 |
| 2011/0236622 A1 | 9/2011 | Tacke et al. | |
| 2013/0112811 A1 | 5/2013 | Mayer et al. | |
| 2013/0306794 A1 * | 11/2013 | Zahlen | B64C 1/068 244/118.5 |
| 2014/0001312 A1 * | 1/2014 | Milliere | B64C 1/062 244/121 |
| 2015/0225063 A1 * | 8/2015 | Littell | B64C 1/062 244/119 |

FOREIGN PATENT DOCUMENTS

| | | |
|---|---|---|
| DE | 102007030026 | 1/2009 |
| DE | 102008042452 | 4/2010 |

(Continued)

OTHER PUBLICATIONS

European Search Report, Mar. 13, 2015.

(Continued)

*Primary Examiner* — Valentina Xavier
(74) *Attorney, Agent, or Firm* — Greer, Burns & Crain, Ltd.

(57) ABSTRACT

An aircraft fuselage including an outer skin that is stiffened by way of a backing structure and that delimits at least one passenger cabin and one cargo hold. In the vertical direction of the fuselage, the cargo hold is arranged below the passenger cabin. The backing structure in the cargo hold above a cargo-hold floor framework comprises at least two lateral quasi-joints, and below the cargo-hold floor framework comprises at least one further quasi-joint. In the cargo hold, in the longitudinal direction of the fuselage, a multitude of energy absorption devices, arranged one behind the other and acting in the transverse direction of the fuselage, are arranged for absorbing tensile loads.

14 Claims, 7 Drawing Sheets

(56) References Cited

FOREIGN PATENT DOCUMENTS

| DE | 102009020891 | 11/2010 |
| DE | 102009020896 | 11/2010 |
| DE | 102010014638 | 10/2011 |
| DE | 102010027859 | 10/2011 |
| DE | 202013105503 | 1/2014 |
| EP | 1179472 | 2/2002 |
| FR | 2936218 | 3/2010 |
| WO | 2010034594 | 4/2010 |

OTHER PUBLICATIONS

German Search Report, Feb. 17, 2014.

* cited by examiner

AIRCRAFT FUSELAGE

BACKGROUND OF THE INVENTION

The invention relates to an aircraft fuselage.

Generally speaking, aircraft fuselages comprise an outer skin that is stiffened by way of a backing structure and that in the vertical direction of the fuselage delimits an upper passenger cabin or an above-floor region and a lower cargo hold or below-floor region. The backing structure usually comprises stringers that extend in the longitudinal direction of the fuselage, and frame elements that extend in the circumferential direction of the fuselage. The passenger cabin and the cargo hold each comprise a floor framework, wherein the cabin floor framework is supported on the backing structure in the cargo hold.

Conventionally, the outer skin and the backing structure are made from metal materials such as aluminium alloys. However, present-day fuselage concepts provide for the metal materials to be replaced by fiber-composite materials, in particular carbon-fiber-reinforced plastics (CFRPs). Because with equal stiffness, fiber-composite materials feature a lighter weight. However, fiber-composite materials have a failure behavior under mechanical load that differs from the failure behavior of metal materials. While the metal materials have high ductility and thus in the case of overload absorb energy under plastic deformation, the fiber-composite materials are brittle so that in the case of overload a sudden total failure with only little energy absorption occurs.

However, in the case of a survivable crash, in other words if a commercial aircraft crashes from a low height, irrespective of the materials used it has to be ensured that the passenger cabin remains intact or almost intact and consequently survival of the passengers is ensured. In order to achieve this, the aircraft fuselage needs to provide corresponding energy absorption in the region of its cargo hold.

DE 10 2007 030 026 A1 shows a structural component for an aircraft fuselage that combines a frame element with a cargo-hold transverse member, wherein the transverse member has greater stiffness than the frame element. In this arrangement the frame element is used to reinforce the outer skin and is curved in an arc-shaped manner corresponding to an inner contour of the outer skin. The transverse member element transversely interconnects two arc portions of the frame element and absorbs mechanical loads on the structure to a greater extent than do said arc portions. Since the transverse member transversely interconnects the arc portions of the frame element, it is further removed from the outer skin, when viewed in the vertical direction of the fuselage, than the frame element. In the case of overload of the outer skin, first the frame element breaks and absorbs some of the impact energy. Since the stiffness of the transverse member is greater than that of the frame element, said transverse member does not break at the same time as the frame element, but instead in a manner stepped in time under the influence of the energy reduced by the breaking of the frame element. Thus the aircraft is decelerated in a stepped manner.

From DE 10 2008 042 452 A1 a fiber-composite component for energy absorption in the event of a crash is known, which fiber-composite component between its CFRP laminate layers comprises at least one integrated metal foil layer that is corrosion resistant vis-a-vis the CFRP laminate layers. This fiber-composite component combines both advantages of the different materials, namely the high strength including the light weight of the CFRP laminate layers with the high ductility of the metal.

From US 2009/0206202 A1 for energy absorption in the event of a crash it is known to support cargo-hold transverse members by way of almost vertical fiber-composite supports in the vertical direction of the fuselage on a backing structure of the aircraft fuselage, wherein the U-shaped fiber-composite supports by means of a multitude of laminate layers arranged in a stepped manner comprise quasi-wedge-shaped lateral limbs which in the case of overload acting on the aircraft fuselage are intended to be sheared off in a stepped manner.

Further state of the art is shown in FR 2 936 218 A1.

SUMMARY OF THE INVENTION

It is the object of the invention to create an aircraft fuselage which in the event of a crash from a low height ensures the integrity of a passenger cabin and which limits to a survivable extent the deceleration acting on the passengers.

An aircraft fuselage according to the invention comprises an outer skin that is stiffened by way of a backing structure and that delimits a passenger cabin and a cargo hold. In the vertical direction of the fuselage the cargo hold is arranged below the passenger cabin, or the passenger cabin is arranged below the cargo hold. According to the invention, the backing structure in the cargo hold above a cargo-hold floor framework comprises at least two lateral quasi-joints. Furthermore, the backing structure below the cargo hold framework comprises at least one further quasi-joint. In the cargo hold in the longitudinal direction of the fuselage a multitude of energy absorption devices, arranged one behind the other and acting in the transverse direction of the fuselage, are arranged for absorbing tensile loads.

The quasi-joints represent so-called trigger regions that are designed in such a manner that in the case of overload the backing structure in these regions fails earlier than adjacent structural components. Thus in the region of the quasi-joints initial failure of the backing structure occurs. The quasi-joints preferably extend over the entire fuselage length. The quasi-joints form quasi-axes of rotation for the structural components arranged between them in the longitudinal direction of the fuselage. If at least two lateral quasi-joints and a middle quasi-joint are provided, in each case at least two such structural components are created. During a crash these at least two structural components remain undamaged or almost undamaged so that their behavior over the entire duration of the crash is predictable. At impact, in the region of the quasi joints failure of the backing structure occurs, for example in the form of a frame element fracture or failure, and thus flattening of the outer skin in the region of the cargo hold occurs. The resulting kinematics, in other words a displacement and rotation, in the longitudinal direction of the fuselage, of the structural components formed between the quasi-joints, generates positive displacement or elongation of the cargo hold or of the cargo hold structure in the transverse direction of the fuselage. During this process, the energy absorption devices acting in the transverse direction of the fuselage absorb part of the kinetic energy, thus reducing the loads acting on the passenger cabin. After impact, the lateral structural portions support the passenger cabin, to which portions the cabin floor framework is connected in the transverse direction of the fuselage. Such an aircraft fuselage is suitable for metal construction, for fiber-composite construction and for hybrid construction in which, for example, the outer skin comprises CFRP, and the backing structure, for example at least individual frame elements, comprises metal.

Energy absorption devices for energy absorption include, for example, tensile elements based on plasticity.

In a preferred exemplary embodiment the cargo-hold floor framework at the height of its floor panels and above its floor panels is on both sides spaced apart from the backing structure. Consequently, in the event of a crash the at least two structural components can be freely pivoted on the axes of rotation of the lateral quasi-joints, because the cargo-hold floor framework quasi-laterally is not connected to the backing structure.

In an exemplary embodiment at least some of the energy absorption devices, either individually or severally, are arranged between floor supports, between which the at least one further quasi-joint is formed, and are connected to the aforesaid. As a result of this arrangement, the energy absorption devices in the transverse direction of the fuselage are within the lateral quasi-joints, and in the vertical direction of the fuselage are above the at least one further quasi-joint, so that the impact energy is transmitted directly into the energy absorption devices. Preferably, in this exemplary embodiment the energy absorption devices are below the floor panels and are thus separately connected to the respective floor supports.

In an alternative exemplary embodiment at least some of the energy absorption devices, either individually or severally, are integrated in floor panels. The energy absorption devices and the corresponding floor panels form a unit, whereby fundamentally the installation of the aircraft fuselage in the cargo hold region is simplified because the energy absorption devices do not have to be installed separately. These floor panels must correspondingly be connected to the floor supports so as to absorb the impact energy.

In a further exemplary embodiment at least some of the energy absorption devices in the circumferential direction of the fuselage between the cabin floor framework and the lateral quasi-joints are connected to the backing structure, wherein the energy absorption devices, in each case by way of at least one rope pulley, cable pulley, wire pulley, belt pulley or chain pulley arrangement and the like, are in operative connection with a floor support which, when viewed from the energy absorption device, is situated on the other side of the at least one further quasi-joint. This exemplary embodiment, in which the energy absorption devices in the transverse direction of the fuselage are arranged outside the lateral quasi-joints, provides an advantage, in particular, in that the energy absorption devices are situated in cargo hold regions that during a crash remain intact or almost intact so that the energy absorption devices themselves are protected against unforeseeable damage during the crash. The cable control arrangements are non-yielding under tension, whereby a tensile load is directly transmitted onward to the energy absorption devices, or alternatively are elastic to a certain extent, thus providing a damping action, and consequently part of the impact energy is absorbed by the cable control arrangements themselves.

In order to achieve energy absorption already at minimal deformation of the at least one quasi-joint, the cable control arrangements preferably act on a support portion of the respective floor support, which support portion is distant from the backing structure. Hereby a strong quasi-lever-effect is achieved so that minimal rotation of the at least one further quasi-joint results in a long tension path.

In a further exemplary embodiment the backing structure comprises several further quasi joints between the lateral quasi-joints. In this exemplary embodiment the aircraft fuselage comprises at least four, preferably however at least seven, quasi joints arranged side by side in the transverse direction of the fuselage. In the case of seven quasi-joints, in other words in the case of five quasi joints in addition to the two lateral quasi-joints, in the event of a crash for example the respective above-mentioned two pivotable structural components are divided into two respective substructure components so that the cargo hold structure is divided into a multitude of individual components. Thus, in the case of a crash a quasi-joint, for example a middle quasi-joint, carries out a smaller rotation than would be the case if it had been provided on its own, because the respective at least two further quasi joints carry out part of the original individual rotation of the middle quasi-joint.

In each case in the longitudinal direction of the fuselage several energy absorption devices can be associated with the further quasi-joints. The multitude of quasi joints in combination with the energy absorption devices make it possible to absorb greater impact energy. Likewise, the multitude of quasi-joints can also make it possible to achieve finely graduated and particularly gentle deceleration of the aircraft fuselage.

In a further exemplary embodiment the floor structure comprises transverse members, at least some of which comprise at least two energy absorption devices that are provided individually on ends of transverse members and on the backing structure. Such an aircraft fuselage can be made with a conventional cargo-hold floor framework in transverse member construction. In the event of a crash the energy absorption devices on the ends absorb the impact energy. The respective transverse member remains undamaged as a result of this.

Exemplary energy absorption devices for the transverse members provide for the transverse members to be attached to the backing structure by means of rivets, bolts and the like, and for the backing structure and/or the transverse members in the connection region to be designed so that in the event of a crash, as a result of the tensile load the rivets are pulled through the connection regions in the transverse direction of the fuselage, and consequently at least some of the impact energy is reduced. The connection regions provide lower loadability when compared to adjacent structural regions of the backing structure and/or of the transverse members and are thus weakened when compared to adjacent structural regions. Such energy absorption devices are based on the inner walls of holes. This makes possible, in the event of a crash, the predictable pulling-through of the rivets or connecting bolts transversely to their longitudinal axis and thus at least partial reduction in the impact energy, without in this process destroying the backing structure and the transverse members in an uncontrolled manner.

In an exemplary embodiment at least some of the floor supports are themselves designed as energy absorption devices. For example, the floor supports can be designed in such a manner that they display a defined compression behavior in the vertical direction of the fuselage, as a result of which behavior impact energy is reduced.

Furthermore, deceleration behavior of the aircraft fuselage, or energy absorption, can be set in that in the transverse direction of the fuselage, activation with a time offset of at least some of the energy absorption devices takes place.

If the cabin floor framework is supported on the backing structure by way of vertical supports, an exemplary embodiment provides that the connection points of the vertical supports form portions of the lateral quasi-joints on the backing structure. After the impact, the vertical supports can support the cabin floor framework and thus the passenger cabin per se, which results in relieving the strain on lateral structural portions in the region of the cabin floor framework.

Other advantageous exemplary embodiments of the invention form part of further subordinate claims.

BRIEF DESCRIPTION OF THE DRAWINGS

Below, preferred exemplary embodiments of the invention are explained in more detail with reference to schematic diagrams. The following are shown FIGS. 1 and 2 a first exemplary embodiment of the aircraft fuselage according to the invention before and after the event of a crash, FIGS. 3 and 4 a second exemplary embodiment of the aircraft fuselage according to the invention before and after the event of a crash, FIGS. 5 and 6 a third exemplary embodiment of the aircraft fuselage according to the invention before and after the event of a crash, FIGS. 7 and 8 a fourth exemplary embodiment of the aircraft fuselage according to the invention before and after the event of a crash, FIGS. 9 and 10 a fifth exemplary embodiment of the aircraft fuselage according to the invention before and after the event of a crash, FIGS. 11 and 12 a sixth exemplary embodiment of the aircraft fuselage according to the invention before and after the event of a crash, and FIGS. 13 and 14 a seventh exemplary embodiment of the aircraft fuselage according to the invention before and after the event of a crash.

DETAILED DESCRIPTION OF THE PREFERRED EMBODIMENTS

In the following FIGS. 1 to 14, quasi-joints 16, 18, 42, 70, 72, 74, 76 according to the invention are shown as circles. The representation as circles is merely intended to make it easier to understand the invention.

It should be pointed out expressly that the following figures show only exemplary embodiments of an aircraft fuselage 1 according to the invention. The exemplary embodiments are not to be interpreted as limiting the scope of protection of the invention. Furthermore, it should be pointed out that, basically, individual features of the exemplary embodiments can be combined. The individual combinations of features are not limited to the respective exemplary embodiment. In particular, the following should be noted:

Even though in the exemplary embodiments the aircraft fuselage 1 is always shown comprising vertical supports 12, 14 that support a cabin floor framework 8, the aircraft fuselage 1 can also be constructed without such vertical supports 12, 14. Such an aircraft fuselage 1 then comprises a correspondingly stable or reinforced connection of lateral ends of the cabin floor framework to a backing structure of the aircraft fuselage 1. Likewise, the vertical supports 12, 14 can be replaced by inclined supports and the like.

Furthermore, it should be pointed out that the vertical supports 12, 14, even if they always maintain their original length in the exemplary embodiments, can definitely also be compressed or deformed, and thus in the event of a crash can also absorb energy and act as energy absorption devices. As an example, reference is made to the energy absorption capacity of floor supports 24, 26, 28, 30, which capacity is described in some exemplary embodiments. However, it should be noted that such energy absorption capacity of the floor supports 24, 26, 28, 30 and/or of the vertical supports 12, 14 is purely optional.

Furthermore, it should be pointed out that in the exemplary embodiments lateral cargo hold regions 54, 56 which after a crash are designated damaged or intact, with a corresponding design of the aircraft fuselage 1 and in particular its structural components 20, 22 or substructure components 78, 80, 82, can definitely also be reduced in size after a crash. The integrity of the cargo hold regions 54, 56 likewise is purely optional.

Furthermore, it should be pointed out that even though in the following exemplary embodiments always only two lateral quasi-joints 16, 18 are shown above a cargo-hold floor framework 10, it is definitely also possible for more than just two lateral quasi joints 16, 18 to be provided. For example, four lateral quasi-joints above the cargo-hold floor framework 10 could be provided, wherein then on each aircraft fuselage side preferably two quasi joints are arranged. Preferably, on each aircraft fuselage side there is always an identical number of quasi-joints, in particular at the same height. Thus, with a quasi-joint situated in the middle of the aircraft fuselage, preferably an uneven number of quasi-joints results.

Figure 1:
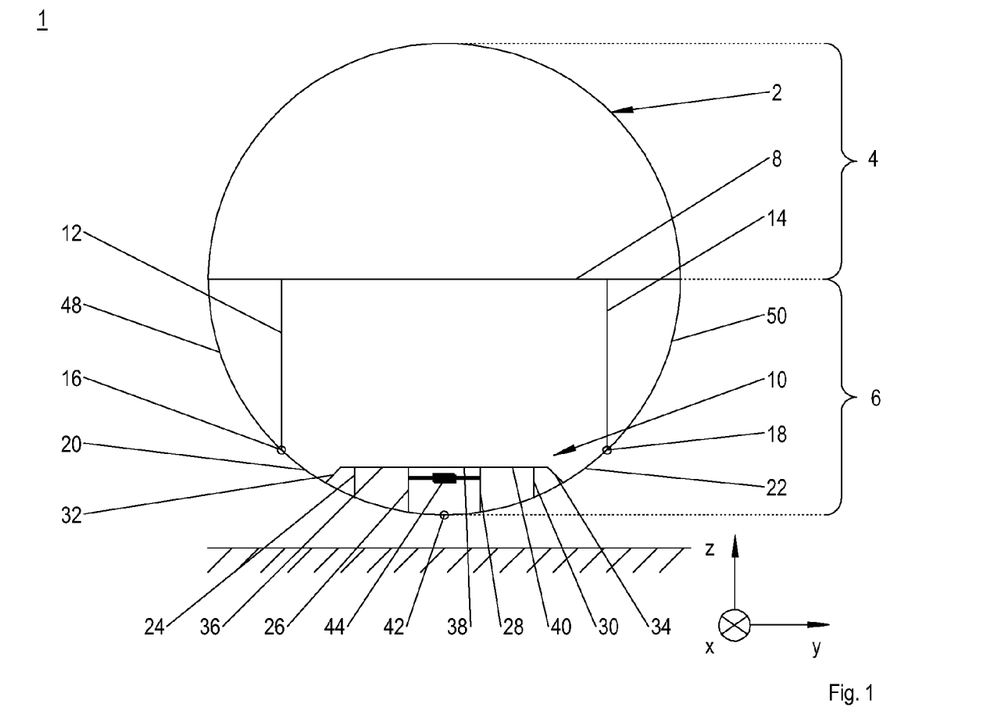

FIG. 1 shows a first exemplary embodiment according to the invention of an aircraft fuselage 1. The aircraft fuselage 1 has an outer skin 2, which is stiffened by way of a backing structure (not shown in detail). The backing structure comprises, for example, a multitude of longitudinal stiffeners, such as stringers, that extend in the longitudinal direction of the fuselage or longitudinal direction x, and circumferential stiffeners, such as frame elements, that extend in the circumferential direction of the fuselage. The outer skin 2 and the backing structure are preferably made in CFRP construction.

The outer skin 2 delimits a passenger cabin 4 and a cargo hold 6 from the external environment. In the vertical direction of the fuselage or in the vertical direction z the passenger cabin 4 is arranged at the top or above the cargo hold 6, and the cargo hold 6 is arranged at the bottom or below the passenger cabin 4. The passenger cabin 4 and the cargo hold 6 each comprises a floor framework 8, 10, wherein the cabin floor framework 8 by way of lateral vertical supports 12, 14 in the region of the cargo hold 6 is supported on the backing structure. The vertical supports 12, 14 are connected by way of connection points to the backing structure, which connection points, for partial absorption of impact energy that in the event of a crash acts on the aircraft fuselage 1, in this exemplary embodiment in each case form direct portions of lateral quasi joints 16, 18. Of course, the lateral quasi-joints 16, 18 can also be formed in the backing structure, so as to be slightly offset in the transverse direction of the fuselage or in the transverse direction y, between the vertical supports 12, 14 or in the circumferential direction of the fuselage within the vertical supports 12, 14. The connection points would then not form direct portions of the lateral quasi joints 16, 18. The cabin floor framework 8, the cargo-hold floor framework 10 and the vertical supports 12, 14 are preferably made in CFRP construction. Of course, the vertical supports 12, 14 can also be made in metal construction or in hybrid construction.

Figure 2:
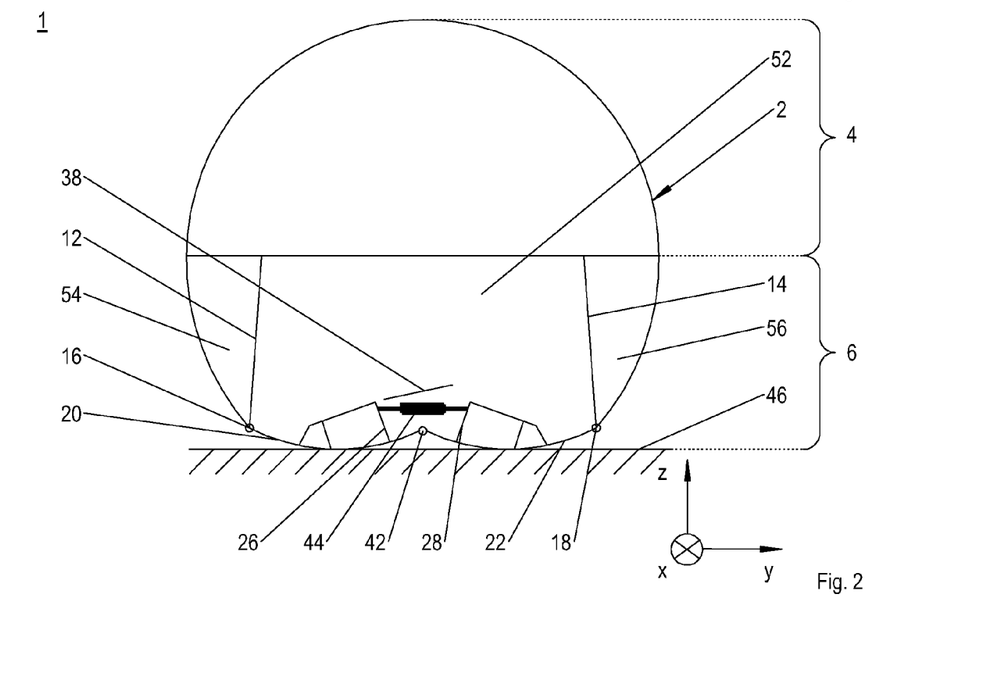

In the context of the invention the term "quasi-joints" refers to portions, in particular of the backing structure, in which portions in the case of overload an initial failure occurs, for example a frame element fracture or failure. As a result of this, axes of rotation are formed that extend in the longitudinal direction x, on which axes of rotation in the event of a crash intact or almost intact structural components 20, 22 of the backing structure and of the outer skin 1 can rotate between the respective adjacent quasi-joints (FIG. 2). The quasi-joints represent so-called trigger regions which in the case of overload fail earlier than adjacent structural portions 48, 50 of the backing structure. Preferably, the quasi-joints extend along the entire fuselage length.

The cargo-hold floor framework 10 has a multitude of floor supports 24, 26, 28, 30, which in the longitudinal direction x are arranged one behind the other and in the transverse direction y are arranged side by side. In the exemplary embodiment shown, the floor supports 24, 26, 28, 30 are evenly spaced apart from each other in the transverse direction y, wherein the floor supports 26, 28 are arranged between the floor supports 24, 30. Therefore, hereinafter, the floor supports 26, 28 are referred to as "middle floor supports" and the floor supports 24, 30 are referred to as "lateral floor supports."

Furthermore, the cargo-hold floor framework 10 comprises a multitude of inclined supports 32, 34 which flank the lateral floor supports 24, 30, which supports 32, 34 are also connected to the backing structure. The inclined supports 32, 34 can be designed as individual supports or can be integral with the lateral floor supports 24, 30. It is imaginable, for example, to combine the lateral floor supports 24, 30 with the respective inclined supports 32, 34 to form floor supports comprising a box structure or an omega profile or hat profile. By means of the inclined supports 32, 34 a design is achieved in which the cargo-hold floor framework 10 at the height of its floor panels 36, 38, 40 and above its floor panels 36, 38, 40 is on both sides spaced apart from the backing structure.

The floor panels 36, 38, 40 have been placed on the floor supports 24, 26, 28, 30. They thus extend in the transverse direction y, in such a manner that each one floor panel 36, 38, 40 is placed with its longitudinal edges on two floor supports 24, 26 or 26, 28 or 28, 30. The floor panels 36, 38, 40 are preferably made in sandwich construction. At the height of the floor panels 36, 38, 40 the cargo-hold floor framework 10 is on both sides spaced apart from the backing structure.

For further partial absorption of impact energy acting on the aircraft fuselage 1 in the event of a crash, between the middle floor supports 26, 28 the backing structure comprises a further quasi-joint 42 and at least in the longitudinal direction x of the fuselage a multitude of middle energy absorption devices 44. Hereinafter, the middle quasi joint 42 is also referred to as the "middle joint 42." The middle quasi-joint 42 in combination with the lateral quasi-joints 16, 18 makes it possible for the two structural components 20, 22 to rotate relative to each other. The energy absorption devices 44 extend in the transverse direction y between the middle floor supports 26, 28, thus acting in the transverse direction y. In the vertical direction z said energy absorption devices 44 are arranged between the middle quasi-joint 42 and the respective middle floor panel 38.

As shown in FIG. 2, in the event of a crash, when the aircraft fuselage 1 impacts the ground 46, flattening of the aircraft fuselage, in other words of the backing structure and of the outer skin 2 in the region of the cargo hold 6, takes place. The cargo hold 6 is elongated in the transverse direction y wherein the backing structure on the quasi-joints 16, 18, 42 shows initial failure, and the cargo hold 6 is compressed, whereby part of the impact energy is absorbed. In this process, initial failure first shows on the middle quasi-joint 42 and then on the lateral quasi-joints 16, 18. The middle quasi joint 42 opens, and the structural components 20, 22 pivot in the longitudinal direction x on the axes of rotation of the lateral quasi-joints 16, 18. As a result of the rotation of the structural components 20, 22 the respective energy absorption device 44 is elongated and thus subjected to tension, whereby a further part of the impact energy is absorbed. The middle floor supports 26, 28 laterally tilt away in opposite directions, whereby the middle floor panel 38 of the middle floor supports 26, 28 becomes detached and in the case of an empty cargo hold 6 is quasi lifted off. As a result of this, the impact energy is absorbed, and the aircraft fuselage 1 is gently decelerated so that the integrity of the passenger cabin 4 and the reduction in passenger deceleration are ensured. In particular, the cargo hold 6 is sequentially or incrementally deformed. In this embodiment the quasi joints 16, 18, 42 are designed so that the cargo hold 2 remains closed, in other words that the outer skin 2 is not ripped open.

Apart from the passenger cabin 4, in the transverse direction y, too, outside the lateral quasi joints 16, 18 on the backing structure the structural portions 48, 50 of the cargo hold structure remain intact or almost intact. To this effect the vertical supports 12, 14 are designed in such a manner that buckling away in the event of a crash is prevented. Following the event of a crash, the cargo hold 6 can be divided into quasi three regions, namely a middle, deformed, cargo hold region 52 and two lateral, intact or almost intact, cargo hold regions 54, 56.

Figure 3:
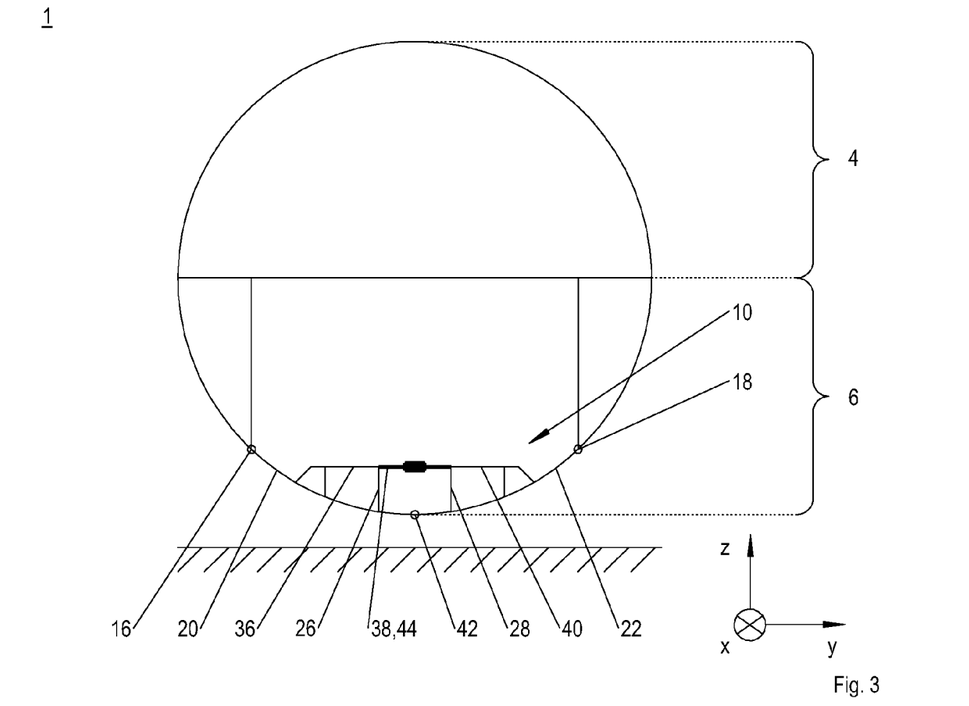
Figure 4:
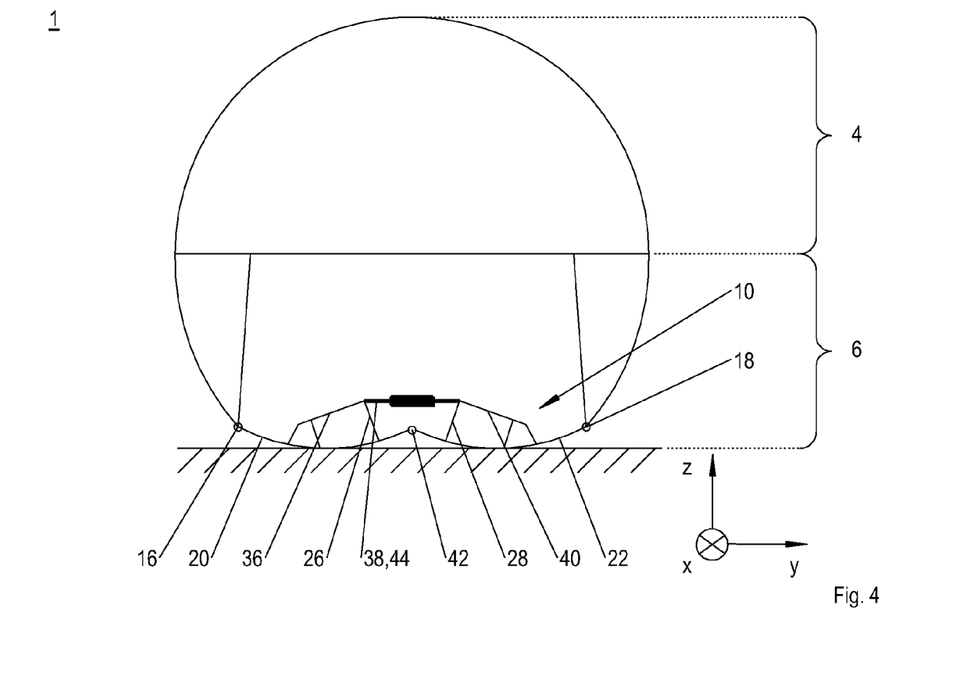

FIGS. 3 and 4 show a second exemplary embodiment of the aircraft fuselage 1 according to the invention. Corresponding to the first exemplary embodiment according to FIGS. 1 and 2, in this exemplary embodiment the backing structure comprises three quasi joints 16, 18, 42 and two structural components 20, 22 which in the event of a crash can be pivoted on the lateral quasi joints 16, 18. Furthermore, the cargo-hold floor framework 10 is of an identical design and thus at the height of its floor panels 36, 38, 40 and above its floor panels 36, 38, 40 and thus quasi laterally is spaced apart from the structural components 20, 22.

In contrast to the first exemplary embodiment according to FIGS. 1 and 2, in this second exemplary embodiment the middle energy absorption device 44 is in each case integrated in the middle floor panel 38. The energy absorption device 44 is thus not located separately under the middle floor panel 36, but instead, with said middle floor panel 36, forms a component, a so-called floor-panel energy absorption system. In order to absorb the corresponding impact energy, any lifting off of the respective middle floor panel 38 from the middle floor supports 26, 28 must be prevented by all means. The floor panel 38 or the floor-panel energy absorption system is correspondingly firmly connected to the middle floor supports 26, 28. The passenger cabin 4 remains intact.

Figure 5:
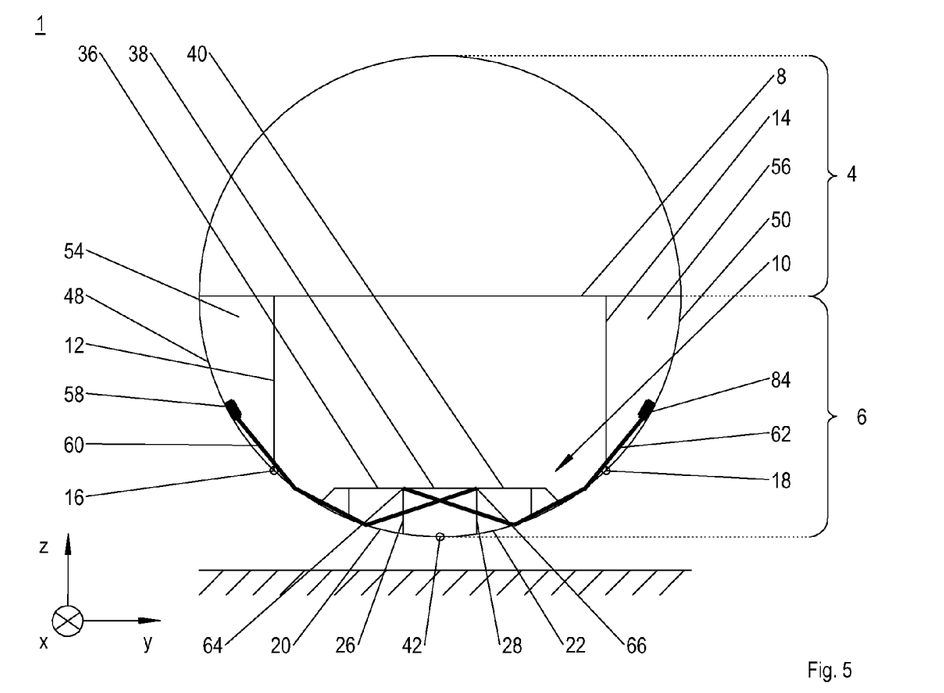
Figure 6:
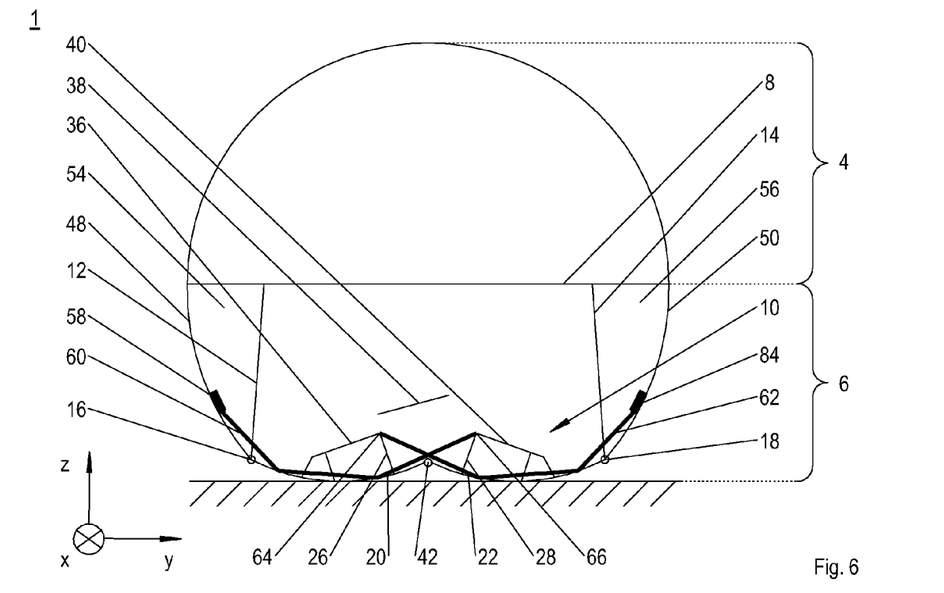

FIGS. 5 and 6 show a third exemplary embodiment of the aircraft fuselage 1 according to the invention. Corresponding to the two preceding exemplary embodiments according to FIGS. 1 to 4, in this exemplary embodiment the backing structure comprises three quasi joints 16, 18, 42 and two structural components 20, 22 that in the event of a crash are pivotable on the lateral quasi-joints 16, 18. Furthermore, the cargo-hold floor framework 10 is of an identical design and thus at the height of its floor panels 36, 38, 40 and thus quasi laterally is spaced apart from the structural components 20, 22.

In contrast to the two preceding exemplary embodiments according to FIGS. 1 to 4, in this third exemplary embodiment two lateral energy absorption devices 58, 84 that act in the transverse direction y are provided, which energy absorption devices 58, 84 furthermore are arranged on the structural portions 48, 50 in the cargo hold 6, with the behavior of said energy absorption devices 58, 84 over the entire duration of the crash being foreseeable, or which energy absorption devices 58, 84 remain intact during the entire crash process. In this embodiment the energy absorption devices 58, 84 are thus arranged so as to be protected in the lateral cargo hold region 54, 56 outside the vertical supports 12, 14 or in the circumferential direction of the fuselage between the cabin floor framework 8 and the vertical supports 12, 14. In order to establish an operative connection with the energy absorption devices 58, 84, 44, 58 and the floor framework 10, for each energy absorption device 58, 84, 44, 58 at least one cable control arrangement 60, 62 is provided, which cable control arrangement 60, 62 is connected to the respective energy absorption device 58, 84 and to a support head 64, 66 of the middle floor support 26, 28 which in each case is situated on the other side of the energy absorption device 58, 84. Thus in the region of the middle quasi-joint 42 the cable control arrangements 60, 62 are arranged so as to be crossed. In this exemplary embodiment the cable control arrangements 60, 62 are non-yielding under tension so that they forward-transmit a tensile load directly to the energy absorption devices 58, 84. As an alternative, the cable control arrangements 60, 62 are to a certain extent elastic, thus providing a damping action, whereby part of the impact energy is reduced as a result of the cable control arrangements 60, 62 themselves.

In the event of a crash the cable control arrangements 60, 62 are tensioned, and their tensile loads, depending on their design, in other words non-yielding under tension or elastic, are transmitted, in an undamped or damped manner, to the respective energy absorption device 58, 84. Because the cable control arrangements 60, 62 in the region of the middle quasi joints 42 on the support heads 64, 66 and thus in the vertical direction z away from the backing structure act on the middle floor supports 26, 28, already minimum rotation of the respective middle quasi joint 42 results in a long tension path. The passenger cabin 4 remains intact.

Figure 7:
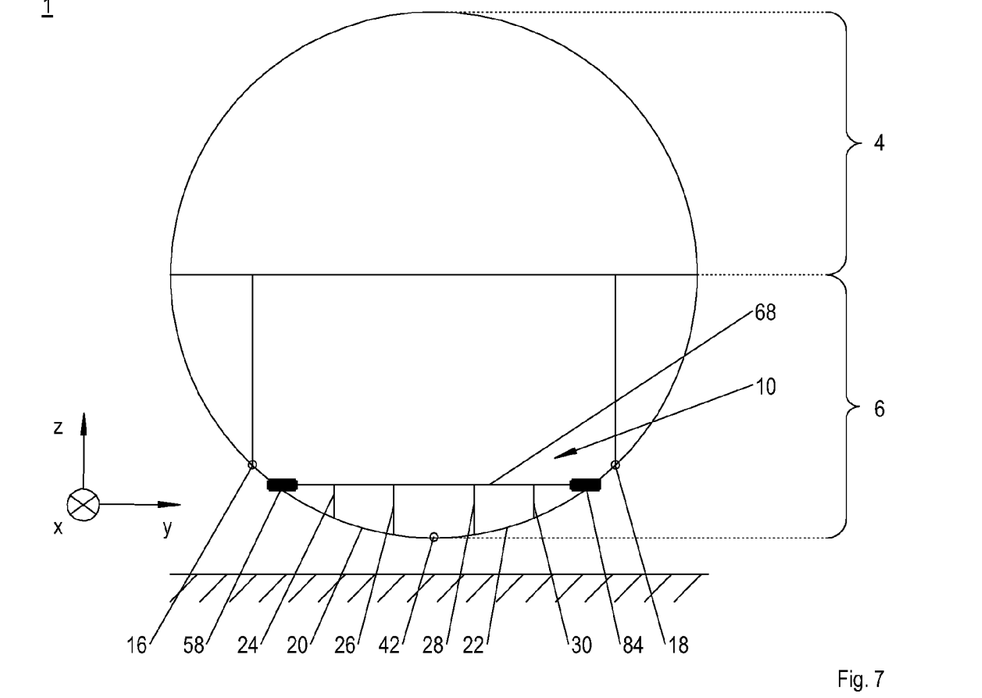
Figure 8:
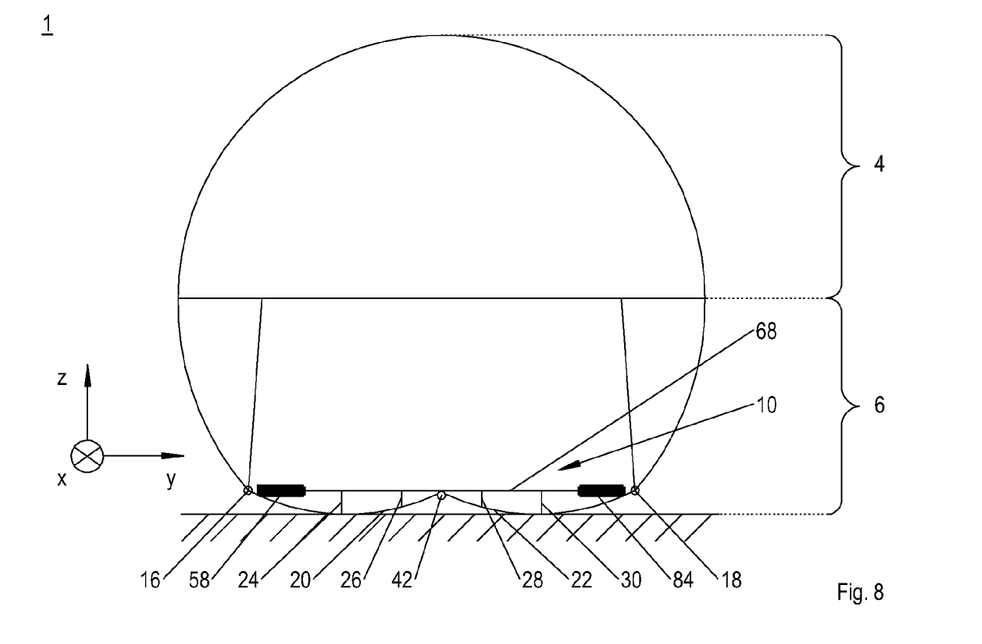

FIGS. 7 and 8 show a fourth exemplary embodiment of the aircraft fuselage 1 according to the invention. Corresponding to the three preceding exemplary embodiments according to FIGS. 1 to 6, in this exemplary embodiment the backing structure comprises three quasi joints 16, 18, 42 and two structural components 20, 22 which in the event of a crash can be pivoted on the lateral quasi-joints 16, 18.

In contrast to the three preceding exemplary embodiments according to FIGS. 1 to 6, in this fourth exemplary embodiment the cargo-hold floor framework 10 comprises a multitude of transverse members 68 which are connected on one side, in each case by way of a lateral energy absorption device 58, 84, to the backing structure between the vertical supports 12, 14 at the height of floor panels (not shown). Furthermore, the transverse members 68 are supported, by way of a multitude of floor supports, on the backing structure 24, 26, 28, 30. Thus in this exemplary embodiment the floor framework 10 is quasi laterally connected to the structural components 20, 22 and not spaced apart from them.

In particular, the energy absorption devices 58, 84 are directly integrated in a connection region formed by the transverse members 68 with the backing structure. Exemplary energy absorption devices 58, 84 provide for attachment of the transverse members 68 by means of rivets, bolts and the like to the frame elements of the backing structure, wherein in each case the rivets lead through a connection region on the backing structure and on the transverse members 68, which connection region has a lower load capacity than adjacent structural regions.

In the event of a crash, during flattening of the cargo hold 6 the rivets are pulled across the connection regions. This results in at least a partial reduction of the impact energy, without in this process uncontrollably destroying the backing structure and the transverse members 68. As a result of the impact, furthermore, the floor supports 24, 26, 28, 30 are compressed. In particular, the floor supports 24, 26, 28, 30 are designed such that their compression takes place in a controlled manner, in other words that they thus act as further energy absorption devices. The passenger cabin 4 remains intact.

Figure 9:
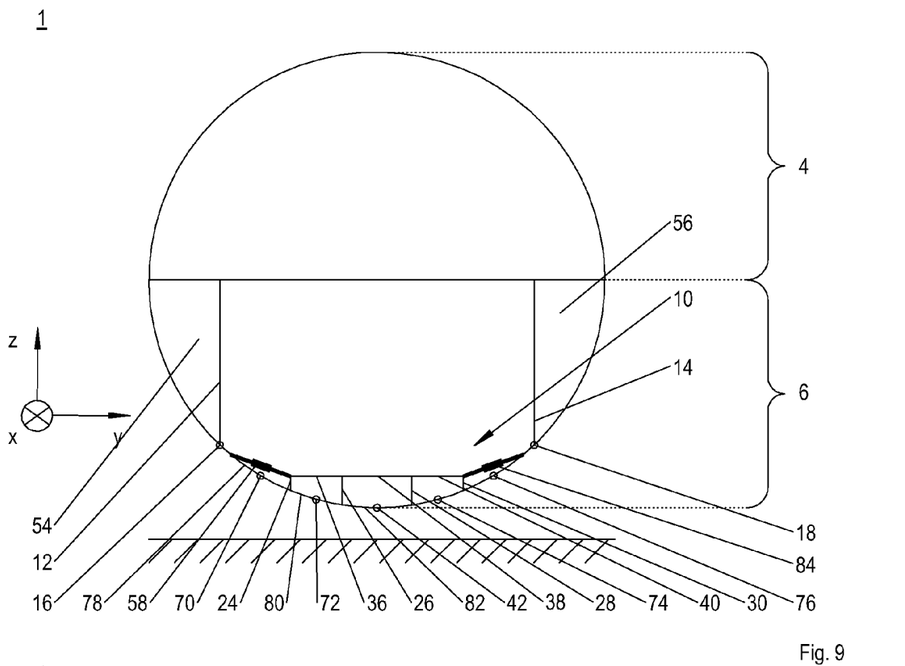
Figure 10:
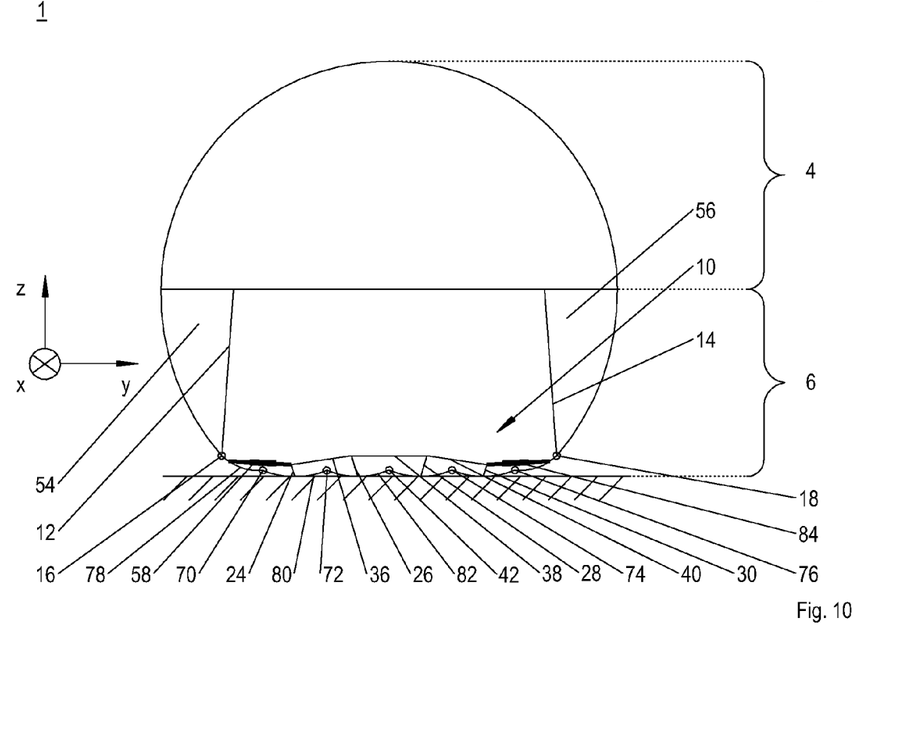

FIGS. 9 and 10 show a fifth exemplary embodiment of the aircraft fuselage 1 according to the invention. Corresponding to the first, second and third exemplary embodiments according to FIGS. 1 to 6, a cargo-hold floor framework 10 at the height of its floor panels 36, 38, 40 is spaced apart quasi laterally from the structural components 20, 22, which in FIGS. 9 and 10 are not designated by reference characters. However, in contrast to these exemplary embodiments the cargo-hold floor framework 10 does not have inclined supports 32, 34.

In contrast to all the preceding exemplary embodiments according to FIGS. 1 to 8, in this fifth exemplary embodiment the backing structure in the region of the cargo hold 6 comprises seven quasi joints 16, 18, 42, 70, 72, 74, 76. In addition to the lateral quasi-joints 16, 18 in the connection region of the vertical supports 12, 14 and in addition to the middle quasi-joint 42 between the middle floor supports 26, 28 of the floor frameworks 10, between the lateral quasi-joints 16, 18 and the middle quasi joint 42 in each case two further quasi-joints 70, 72, 74, 76 are provided. Hereinafter, in the entire description of the figures the further quasi joints 72, 74 are also referred to as "further inner quasi-joints", and the further quasi-joints 70, 76 are referred to as "outer quasi-joints." Hereby the structural components 20, 22, shown with reference characters in the preceding figures, are subdivided in each case into three substructure components 78, 80, 82 in the event of a crash. For improved clarity, only the substructure components 78, 80, 82 of the left-hand structural component 20 according to the illustration in FIGS. 9 and 10 have been given reference characters. The multitude of quasi-joints 16, 18, 42, 70, 72, 74, 76 make it possible to absorb greater impact energy. However, the multitude of quasi joints 16, 18, 42, 70, 72, 74, 76 can also make it possible to achieve finely graduated deceleration of the aircraft fuselage 1.

The at least in each case two lateral energy absorption devices 58, 84 are arranged between the lateral floor supports 24, 30 and the backing structure. They are thus positioned laterally of the floor structure 10 near the lateral quasi joints 16, 18, and in the event of a crash are positioned in the region of the respectively outer substructure component 78.

In the event of a crash the cargo hold 6 is compressed between the vertical supports 12, 14. In particular, it is deformed sequentially or incrementally. The structural components 20, 22 (not numbered) are elongated and consequently the substructure components 78, 80, 82 are formed. Preferably, the substructure components 78, 80, 82 form from the inside to the outside, in other words first the inner substructure component 82 is formed, followed by the middle substructure component 80, and finally by the outer substructure component 78. Accordingly, initial failure preferably only manifests itself on the middle quasi-joint 42 and then from the inside to the outside by way of the further quasi-joints 72, 70 or 74, 76 to the lateral quasi joints 16, 18. As an alternative, initial failure only manifests itself on the middle quasi-joint 42, then on the lateral quasi joints 16, 18 and then, if there is still some impact energy to be absorbed, on the further quasi joints 70, 72, 74. The cargo-hold floor framework 10 bends upwards and in so doing is stretched.

As is the case in all the preceding exemplary embodiments according to FIGS. 1 to 8, in the fifth exemplary embodiment, too, apart from the passenger cabin 4, lateral cargo hold regions 54, 56, in other words the cargo hold regions 54, 56 outside the vertical supports 12, 14, remain intact or almost intact following the event of a crash.

As a result of the impact, furthermore, the floor supports 24, 26, 28, 30 are compressed or deformed. In particular, the floor supports 24, 26, 28, 30 can be designed such that their compression or deformation takes place in a controlled manner and they thus act as further energy absorption devices.

Figure 11:
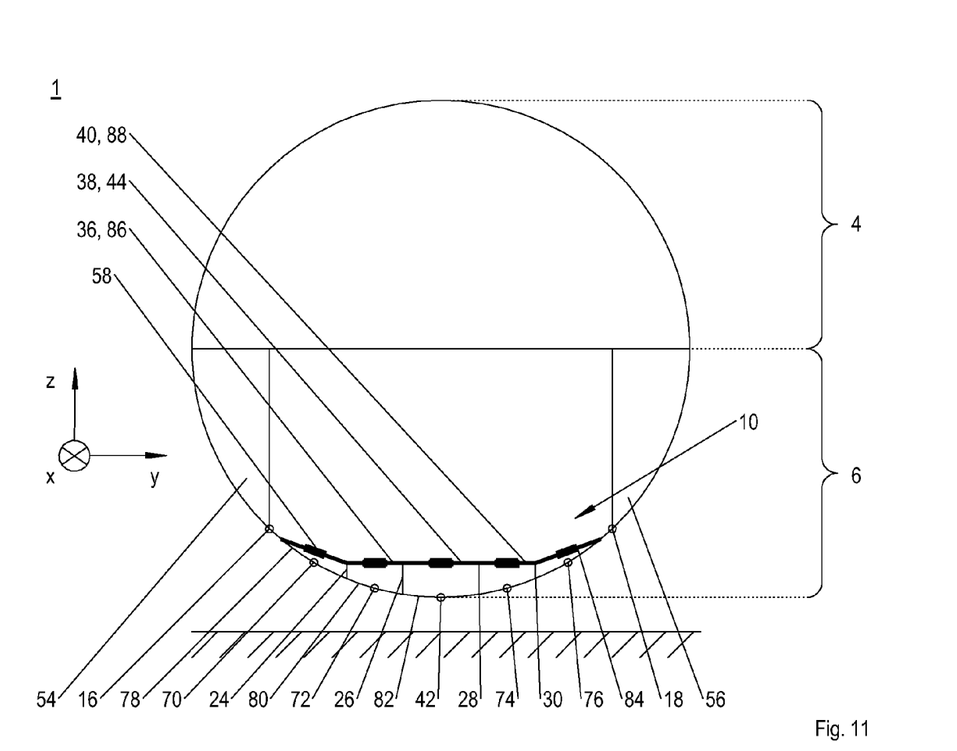
Figure 12:
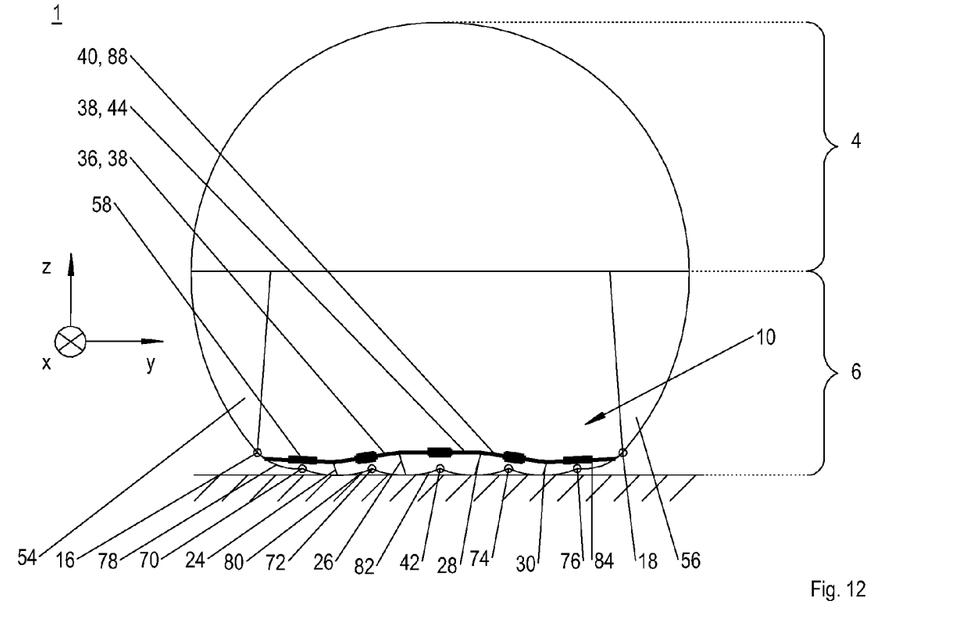

FIGS. 11 and 12 show a sixth exemplary embodiment of the aircraft fuselage 1 according to the invention. The sixth exemplary embodiment is similar to the fifth exemplary embodiment according to FIGS. 9 and 10. Correspondingly it comprises seven quasi-joints 16, 18, 42, 70, 72, 74, 76 and six substructure components 78, 80, 82. Furthermore, the cargo-hold floor framework 10 is designed identically and thus at the height of its floor panels 36, 38, 40 and thus quasi laterally is spaced apart from the backing structure.

In contrast to the sixth exemplary embodiment according to FIGS. 9 and 10, in this exemplary embodiment in each case in the transverse direction y more than two energy absorption devices 44, 58, 84, 86, 88 are provided. In the exemplary embodiment shown, in addition to the lateral energy absorption devices 58, 84 according to the fifth exemplary embodiment according to FIGS. 9 and 10, at least three middle energy absorption devices 44, 86, 88 are provided. The middle energy absorption devices 44, 86, 88 are in each case integrated in the floor panels 36, 38, 40; however, they can also be positioned so as to be separate of the floor panels 36, 38, 40 and below them. Of course, it is also possible for at least some of the energy absorption devices 44, 86, 88 to be integrated in the floor panels 36, 38, 40, and for some of them to be arranged below the floor panels 36, 38, 40 and so as to be separate of the floor panels 36, 38, 40.

The energy absorption devices 44, 58, 84, 86, 88 act in series, and in each case are associated with one of the further quasi-joints 42, 70, 72, 74, 76. This makes it possible to achieve very precise setting of behavioral characteristics of the aircraft fuselage 6 in the event of a crash. Chronologically sequential activation or triggering becomes possible, in particular depending on defined elongation.

When translated to a force path diagram, this means, for example, that when a limiting force is exceeded, as a result of the impact an initiation process takes place, and the middle quasi joint 42 and consequently the middle energy absorption device 44 are activated. After a precisely defined elongation of the energy absorption device 44 has been reached, the tensile force of said energy absorption device 44 increases sharply (so-called stop function). Thus the middle energy absorption device 86, 88 and consequently the further inner quasi joints 72, 74 are activated, wherein the force progression remains almost constant. After a precisely defined maximum deformation or elongation of the middle energy absorption device 86, 88 and consequently the pivoting of the middle and the further inner quasi joints 42, 72, 74, the force progression in the middle energy absorption device 86, 88 increases (stop function), whereby the lateral energy absorption device 58, 84 and consequently the outer quasi-joints 70, 76 are activated. The force progression then remains constant again until maximum deformation has been reached. According to the invention, the lateral energy absorption device 58, 84 no longer comprises a stop function so that in this embodiment an elongation right up to complete energy absorption of the impact energy or right up to impact of the vertical supports 12, 14 on the ground 46 takes place. The lateral quasi-joints 16, 18 are activated approximately simultaneously with the middle energy absorption device 44 of the middle quasi-joint 42.

As has, for example, already been mentioned with reference to the fourth exemplary embodiment according to FIGS. 7 and 8, compression or deformation of the floor supports 24, 26, 28, 30 in the event of a crash can also be used for energy absorption, and the floor supports 24, 26, 28, 30 themselves can thus act as energy absorption devices. The passenger cabin 4 remains intact.

Figure 13:
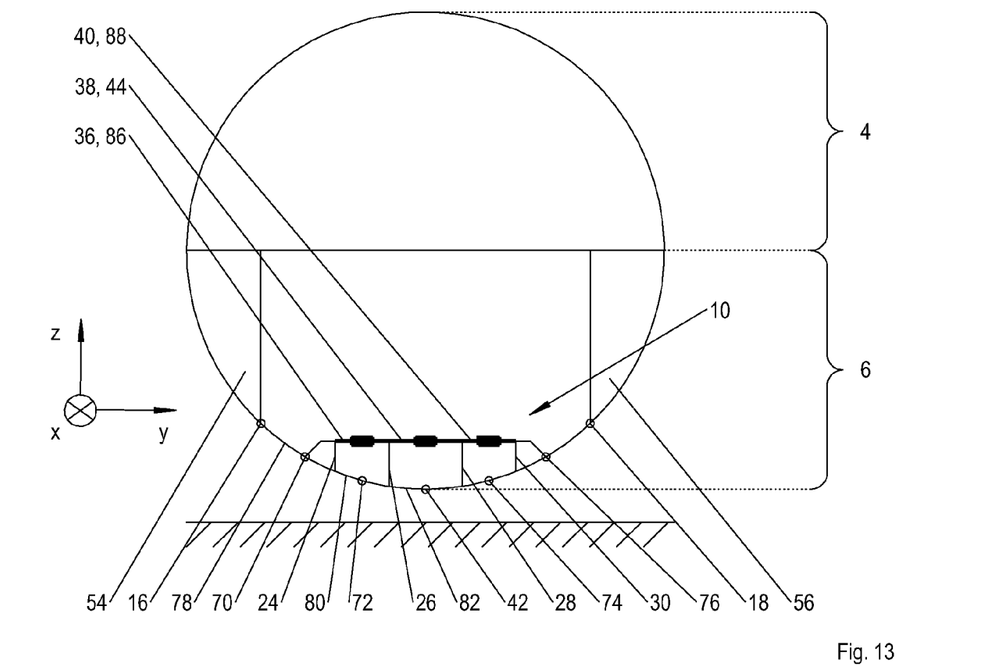
Figure 14:
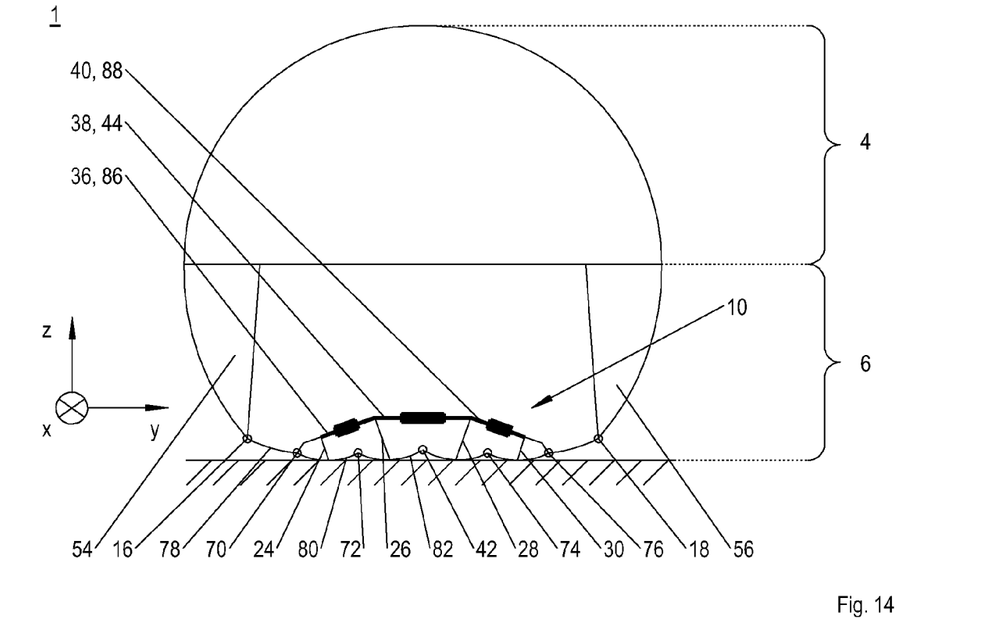

FIGS. 13 and 14 show a seventh exemplary embodiment of the aircraft fuselage 1 according to the invention. The seventh exemplary embodiment is designed in a manner similar to the design of the second exemplary embodiment according to FIGS. 3 and 4 and similar to the design of the sixth exemplary embodiment according to FIGS. 11 and 12. The seventh exemplary embodiment comprises seven quasi-joints 16, 18, 42, 70, 72, 74, 76 and six substructure components 78, 80, 82. Furthermore, the cargo-hold floor framework 10 at the height of its floor panels 36, 38, 40 is quasi laterally spaced apart from the backing structure. Two outer quasi-joints 70, 76 are formed directly in the region of lateral inclined supports 32, 34 of the cargo-hold floor framework 10.

In each case there are at least three energy absorption devices 44, 86, 88 that are arranged side by side in the transverse direction y. In this exemplary embodiment the energy absorption devices 44, 86, 88 are designed to be integral with the floor panel 36, 38, 40; however, modeled after the first exemplary embodiment according to FIGS. 1 and 2, they can also be arranged below the floor panels 36, 38, 40. Of course, some energy absorption devices 44, 86, 88 can also be integrated in the floor panels 36, 38, 40, and some can be arranged below the floor panels 36, 38, 40 and thus separate of the floor panels 36, 38, 40 (see FIGS. 1 and 2).

In the event of a crash the quasi-joints 16, 18, 42, 70, 72, 74, 76 are activated as a result of the overload that occurs, whereupon the floor supports 24, 26, 28, 30 are guided outwards in a fan-like manner when viewed in the vertical direction z. This fan-like spreading of the floor supports 24, 26, 28, 30 causes elongation of the energy absorption devices 44, 86, 88, arranged between them and connected to them, and consequently they are subjected to tension, and impact energy is absorbed. The passenger cabin 4 remains intact.

Disclosed is an aircraft fuselage with an outer skin that is stiffened by way of a backing structure and that delimits at least one passenger cabin and one cargo hold, wherein in the vertical direction of the fuselage the cargo hold is arranged below the passenger cabin, wherein the backing structure in the cargo hold above a cargo-hold floor framework comprises at least two lateral quasi-joints, and below the cargo-hold floor framework comprises at least one further quasi-joint, wherein in the cargo hold, in the longitudinal direction of the fuselage, a multitude of energy absorption devices, arranged one behind the other and acting in the transverse direction of the fuselage, are arranged for absorbing tensile loads.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft fuselage comprising:
   an outer skin stiffened by a backing structure, the outer skin delimits at least one passenger cabin and one cargo hold,
   the cargo hold is arranged below the at least one passenger cabin in a vertical direction of the fuselage,
   the backing structure located in the cargo hold and above a cargo-hold floor framework comprises at least two lateral quasi-joints, and the backing structure located below the cargo-hold floor framework comprises at least one further quasi-joint, a multitude of energy absorption devices located in the cargo hold are arranged in a longitudinal direction of the fuselage, the multitude of energy absorption devices are arranged one behind the other and act in a transverse direction of the fuselage and are arranged for absorbing tensile loads, at least two structural components of the backing structure that are each pivotable about their respective lateral quasi-joints, wherein in the event of a crash the at least two structural components can be freely pivoted on the axes of rotation of the respective lateral quasi-joints.

2. The aircraft fuselage according to claim 1, wherein the cargo-hold floor framework, is on both lateral sides spaced apart from the backing structure at the height of its floor panels and above its floor panels.

3. The aircraft fuselage according to claim 1, wherein at least some of the energy absorption devices are arranged between floor supports, the at least one further quasi-joint is formed between floor supports, and at least some of the energy absorption devices are connected to the at least one quasi-joint.

4. The aircraft fuselage according to claim 3, wherein at least some of the energy absorption devices are integrated in floor panels.

5. The aircraft fuselage according to claim 1, wherein at least some of the energy absorption devices are connected to the backing structure in a circumferential direction of the fuselage between the cabin floor framework and the lateral quasi-joints, and wherein these energy absorption devices are in operative connection with a floor support by way of at least one cable control arrangement, which when viewed from one of the energy absorption device on one other side of the further quasi-joint towards a longitudinal axis of the aircraft, the cable control arrangement corresponding to said one of the energy absorption devices acts on the floor support at the opposite side of the at least one further quasi-joint.

6. The aircraft fuselage according to claim 5, wherein the cable control arrangements act on a support portion of the respective floor support, the support portion is spaced from the backing structure.

7. The aircraft fuselage according to claim 1, wherein the backing structure comprises several further quasi-joints between the lateral quasi-joints.

8. The aircraft fuselage according to claim 7, wherein several energy absorption devices are associated with the further quasi-joints that are located between the quasi-joints.

9. The aircraft fuselage according to claim 1, wherein the cargo-hold floor structure comprises transverse members, at least some of the transverse members comprise at least two energy absorption devices, wherein the at least two energy absorption devices are provided on ends of transverse members and on the backing structure.

10. The aircraft fuselage according to claim 9, wherein the energy absorption devices comprise at least one of rivets and bolts that attach the transverse members to the backing structure, wherein each of the at least one of the rivets and bolts lead through a connection region on the backing structure and the transverse members, the connection region having a lower load capacity than adjacent structural regions.

11. The aircraft fuselage of claim 1, wherein at least some of the floor supports are themselves designed as energy absorption devices.

12. The aircraft fuselage of claim 1, wherein in a transverse direction of the fuselage, at least some of the energy absorption devices comprise a time offset upon activation.

13. The aircraft fuselage of claim 1, wherein the cabin floor framework is supported on the backing structure with vertical supports, and connection points of the vertical supports form portions of the lateral quasi-joints on the backing structure.

14. An aircraft fuselage comprising:

an outer skin stiffened by a backing structure, the outer skin delimits at least one passenger cabin and one cargo hold, the cargo hold is arranged below the at least one passenger cabin in a vertical direction of the fuselage, the backing structure located in the cargo hold and above a cargo-hold floor framework comprises at least lateral quasi-joints, and the backing structure located below the cargo-hold floor framework comprises at least one further quasi-joint.

a multitude of energy absorption devices located in the cargo hold are arranged in a longitudinal direction of the fuselage, the multitude of energy absorption devices are arranged one behind the other and act in a transverse direction of the fuselage and are arranged for absorbing tensile loads, wherein at least some of the multitude of energy absorption devices are connected to The backing structure in a circumferential direction of the fuselage between the cabin floor framework and the lateral quasi-joints, and wherein these energy absorption devices are in operative connection with a floor support by way of at least one cable control arrangement, which when viewed from one of the energy absorption devices on one side of the further quasi-joint towards a longitudinal axis of the aircraft, the cable control arrangement corresponding to said one of the energy absorption devices acts on the floor support at the side of the at least one further quasi-joint.

* * * * *